No. 871,836. PATENTED NOV. 26, 1907.
J. J. WADE.
TRAP OR WATER SEAL.
APPLICATION FILED SEPT. 15, 1906.
3 SHEETS—SHEET 2.
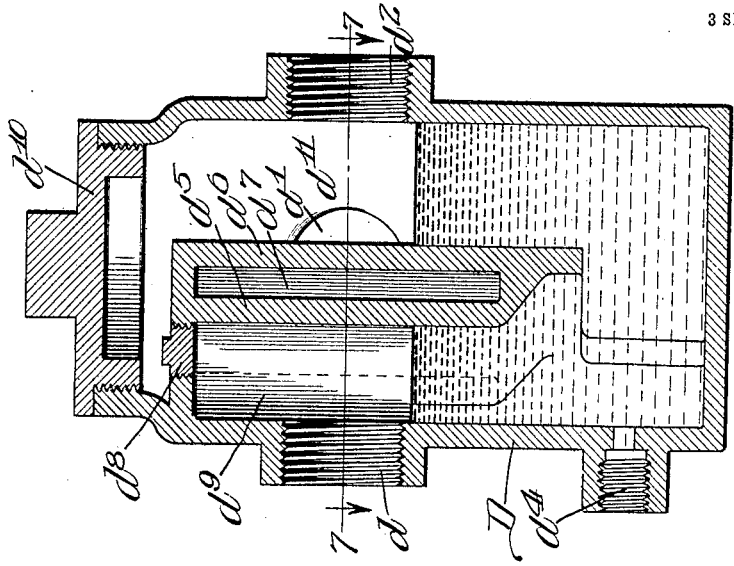
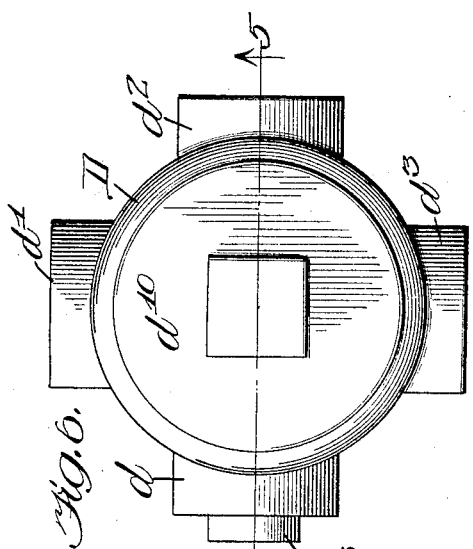
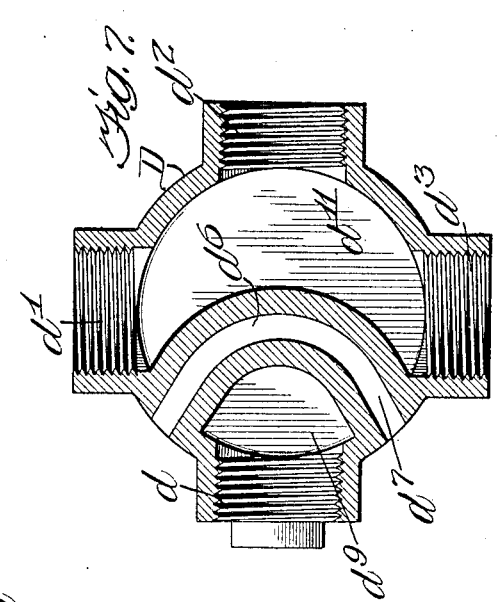
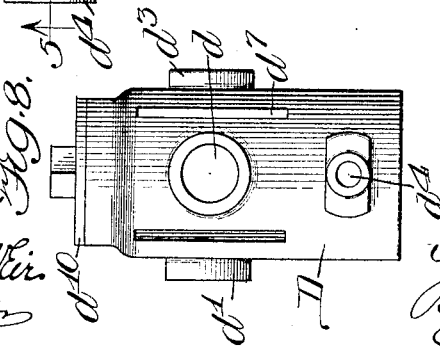
Witnesses:
Inventor:
James J. Wade

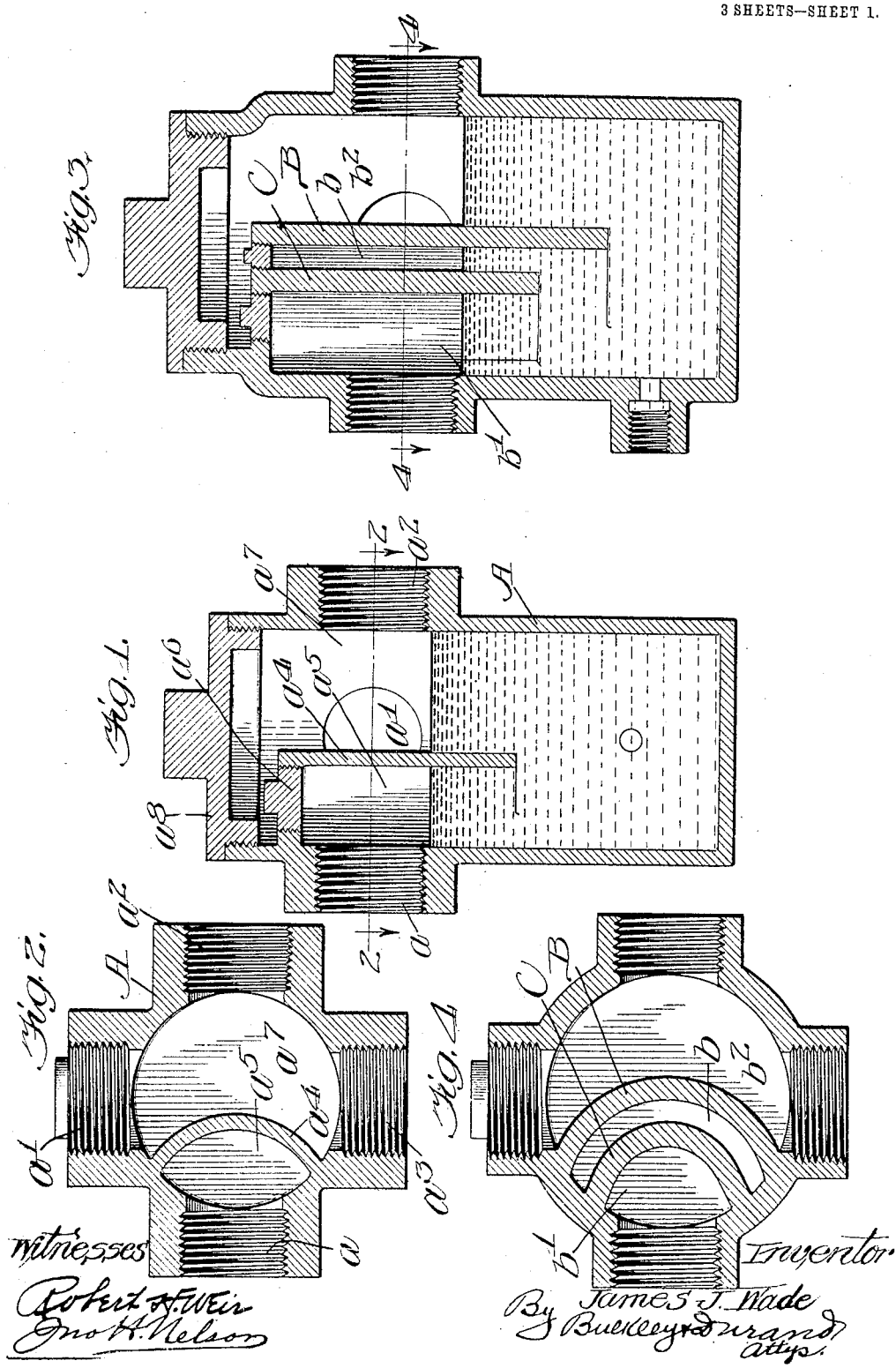

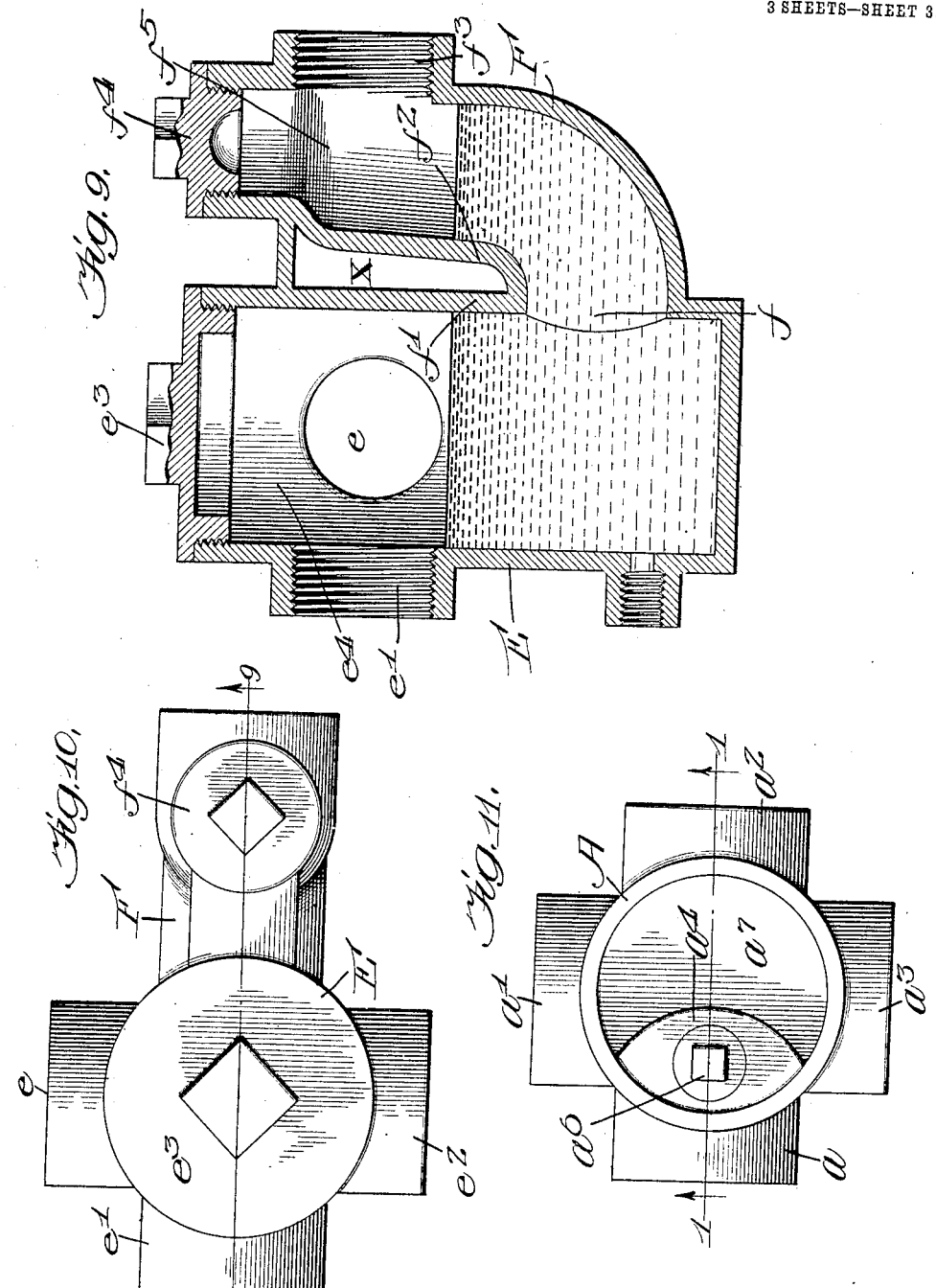

UNITED STATES PATENT OFFICE.

JAMES J. WADE, OF CHICAGO, ILLINOIS.

TRAP OR WATER SEAL.

No. 871,836.  Specification of Letters Patent.  Patented Nov. 26, 1907.

Application filed September 15, 1906. Serial No. 334,780.

*To all whom it may concern:*

Be it known that I, JAMES J. WADE, a citizen of the United States of America, and resident of Chicago, Cook county, Illinois, have invented a certain new and useful Improvement in Traps or Water Seals, of which the following is a specification.

My invention relates to traps or water seals for plumbing systems.

The principal object of my invention is to provide a simple, improved and highly efficient trap or water seal.

A special object of my invention is to provide a trap or seal having an inclosed double wall provided with an air space which is open at each end, whereby any defect in the said wall will become at once apparent by the leakage of water into the said air space, as will hereinafter more fully appear.

To the foregoing and other useful ends, my invention consists in certain features of improvement, details of construction and combinations of elements hereinafter set forth and claimed.

In the accompanying drawings,—Figure 1 is a vertical section of a trap having a single wall seal; Fig. 2 is a section on line 2—2 in Fig. 1; Fig. 3 is a vertical section of a trap having a double wall seal; Fig. 4 is a horizontal section on line 4—4 in Fig. 3; Fig. 5 is a view similar to Fig. 3, but showing the air space in the double wall closed at the bottom thereof; Fig. 6 is a plan of the device shown in Fig. 5; Fig. 7 is a horizontal section on line 7—7 in Fig. 5; Fig. 8 is a reduced side elevation of the device shown in Figs. 5 to 7, inclusive; Fig. 9 is a vertical section of another form of trap; Fig. 10 is a plan of the device shown in Fig. 9; and Fig. 11 is a plan of the device shown in Fig. 1, showing the cap or upper cover removed.

In Fig. 1, the trap consists of an upper cylindric casing A provided at its upper portion with four laterally extending sockets or internally-threaded bosses $a$—$a'$—$a^2$—$a^3$. An intake pipe, such as a pipe leading from a sink or bath-tub, can be coupled to any one of the bosses $a'$—$a^2$—$a^3$, and an offtake or sewer pipe can be coupled to the boss $a$. A vertically-disposed curved wall $a^4$ extends below the water level, and forms a water seal, the space $a^5$ being closed at its top, and provided with a plug or closure $a^6$. Any sewer gas which may find its way into the sewer pipe cannot reach the main chamber $a^7$ because of the water seal. An upper cap or plug $a^8$ is provided for the top of the cylinder A.

In Fig. 3, the construction is substantially the same as that shown in Fig. 1, with the exception that an outer or supplemental wall B is provided, in addition to the inner wall C, which latter corresponds to the wall $a^4$ of Fig. 1. This gives a space $b$ between the two walls, which space is open at its bottom, permitting the water to rise in this space, as well as in the inner space $b'$ and the main chamber $b^2$. With this arrangement, a defect in one wall would not do any harm, and would not let the sewer gas pass through the trap, providing the other wall is perfect.

In Fig. 5, the trap consists of a vertically-disposed hollow cylinder D provided at its upper portion with the laterally-extending and internally-threaded bosses $d$—$d'$—$d^2$—$d^3$, similar to those of the previous figures. As in the other traps, the lower drain opening or tap $d^4$ can also be provided, and closed by any suitable means. In this trap, the intake pipe can lead to any one of the bosses $d'$—$d^2$—$d^3$, and the offtake or sewer pipe can lead from the boss $d$. Within the trap there is a curved double wall composed of the two vertical walls $d^5$—$d^6$, providing an air space $d^7$ between them. It will be seen that this air space is closed at top and bottom, but is open at its ends, as shown in Fig. 7. A plug $d^8$ closes the top of the inner space or chamber $d^9$, and a cover or closure $d^{10}$ seals the top of the main chamber $d^{11}$. With this arrangement, the sewer gas cannot pass through the trap owing to the water seal therein, and a defect in either of the walls $d^5$ or $d^6$ is instantly made manifest by leakage of water into the space $d^7$, as the water will then drip or fall upon the floor. In this way, and although the water seal comprises an inclosed vertical wall, there is at the same time practical assurance that sewer gas will not be permitted to pass through the trap and enter the house by reason of any defect in the trap,—that is to say, not to any great extent, as such defect is at once manifest upon coupling the trap in position.

In Fig. 9, the trap comprises a vertical hollow cylinder E provided with three intake bosses $e$—$e'$—$e^2$, as well as with a top or closure $e^3$, which latter closes the top of the main chamber $e^4$. A supplemental, vertically-disposed hollow portion F is provided, and formed integral with the cylinder E, the two communicating at $f$. This brings the spaced walls $f'$—$f^2$ slightly below the level of the water, as shown in Fig. 9, thus forming a water seal, and providing an air space X between said walls, which space like the space $d^7$ is open to the atmosphere at each side. The offtake or sewer pipe can lead from the bottom $f^3$, formed integral with the upper portion of the portion F. A cap or plug $f^4$ closes the upper portion of the supplemental chamber $f^5$. With this arrangement, the sewer gas cannot pass through the trap, and at the same time various connections can be made with the trap, according to the requirements of different plumbing conditions, as in the other figures of the drawing.

What I claim as new is,—

1. In a trap, the combination of a vertically-disposed cylindric body-portion provided with a plurality of intake openings, main and supplemental chambers, an air space between the two chambers, said space communicating with the atmosphere at each side, an offtake or sewer pipe opening leading from the supplemental chamber, means extending below the water level to divide the two chambers and form a water seal, and plugs or closures for the tops of said main and supplemental chambers, the plug or closure for the supplemental chamber being separate from the plug or closure for the main chamber, substantially as set forth.

2. In a trap, the combination of a hollow body-portion, an inclosed vertical wall formed integral with said body portion and extending below the water level to form a water seal, a plurality of intake openings leading to the main chamber formed by said vertical wall, an offtake or sewer opening leading from the supplemental chamber formed by said wall, and removable closure for entering both of said chambers at the tops thereof, the closure for the supplemental chamber being inclosed by the closure for the main chamber.

3. In a trap, the combination of a hollow body-portion, a vertically-disposed double wall formed integral therewith and extending below the water level to form a water seal, intake and offtake openings communicating with the main and supplemental chambers formed by said double wall, said double wall providing an air space between the two chambers, and separate plugs or closures for the tops of the main and supplemental chambers.

4. In a trap, the combination of a hollow body-portion, a vertically-disposed and inclosed double wall therein, formed integral therewith, providing an air space closed at top and bottom, but open to the atmosphere at each side of the trap, said wall extending below the water level to form a water seal, intake and offtake openings communicating with the main and supplemental chambers formed by said double wall, and means for entering the trap.

5. In a trap, the combination of a hollow body-portion provided with an integral portion extending below the water level to form a water seal and providing main and supplemental chambers, said integral portion having an air space therein, a plurality of bosses providing a plurality of openings leading to the main chamber, a single boss providing a single opening communicating with the supplemental chamber, all said bosses located in the same horizontal plane and formed integral with the main body-portion, and removable closures for the tops of said main and supplemental chambers, substantially as set forth.

6. In a trap, an interior vertically-disposed integral wall extending below the water line to form a water seal, provided with an upper horizontal portion, means for fully inclosing said wall, and an inclosed plug or closure for the horizontal upper portion of said wall, substantially as set forth.

7. In a trap, an interior double wall providing an air space which is below the water level and open to the atmosphere at each side of the trap, which wall extends below the water level to form a water seal, and means for fully inclosing said double wall.

Signed by me at Chicago, Illinois, this 10th day of Sept., 1906.

JAMES J. WADE.

Witnesses:
SARAH LEWIS,
ALBERT JOHN SAUSER.